ELECTRICAL DISCHARGE MACHINING POWER SUPPLY CIRCUIT

Filed March 28, 1967

INVENTOR.
Kurt H. Sennowitz
BY
Harry R Dumont
ATTORNEY

United States Patent Office 3,485,989
Patented Dec. 23, 1969

3,485,989
ELECTRICAL DISCHARGE MACHINING POWER SUPPLY CIRCUIT

Kurt H. Sennowitz, Royal Oak, Mich., assignor by mesne assignments, to Elox Inc., Troy, Mich., a corporation of Delaware Filed Mar. 28, 1967, Ser. No. 626,569
Int. Cl. B23k 9/16
U.S. Cl. 219—69 7 Claims

ABSTRACT OF THE DISCLOSURE

A circuit for providing EDM machining pulses from a direct-current source by supplying short gap-voltage-lowering (gap-deionizing) pulses from a triggering circuit coupled to the gap by a transformer whose secondary is connected across the gap in series with a current-limiting capacitor and a diode. The triggering circuit includes a capacitor, a DC source for charging the capacitor, an electronic switch for controlling capacitor discharge thru the primary of the transformer, and a trigger pulse source for controlling the switch.

Background of the invention

The field to which my invention relates is that known an electrical discharge machining in which material is removed from an electrically conductive workpiece by the action of electrical gap discharges between a tool electrode and the workpiece. An electrode or workpiece servo feed system is employed to maintain an optimum gap spacing between electrode and workpiece as metal removal progresses. A dielectric coolant such as kerosene is circulated continuously through the gap during machining operation.

I have found that for fine finishing operation high voltage machining pulses of low current content are highly effective.

Summary of the invention

My invention provides for a finishing power supply circuit in which pulses are generated by controlled capacitor discharge through an electronic triggering device of high voltage capability. Pulses are generated and furnished to the machining gap through a pulse transformer for turn-off of the gap and a separate DC power supply, which supply is connected directly across the gap.

Description

Figures 1, 2:
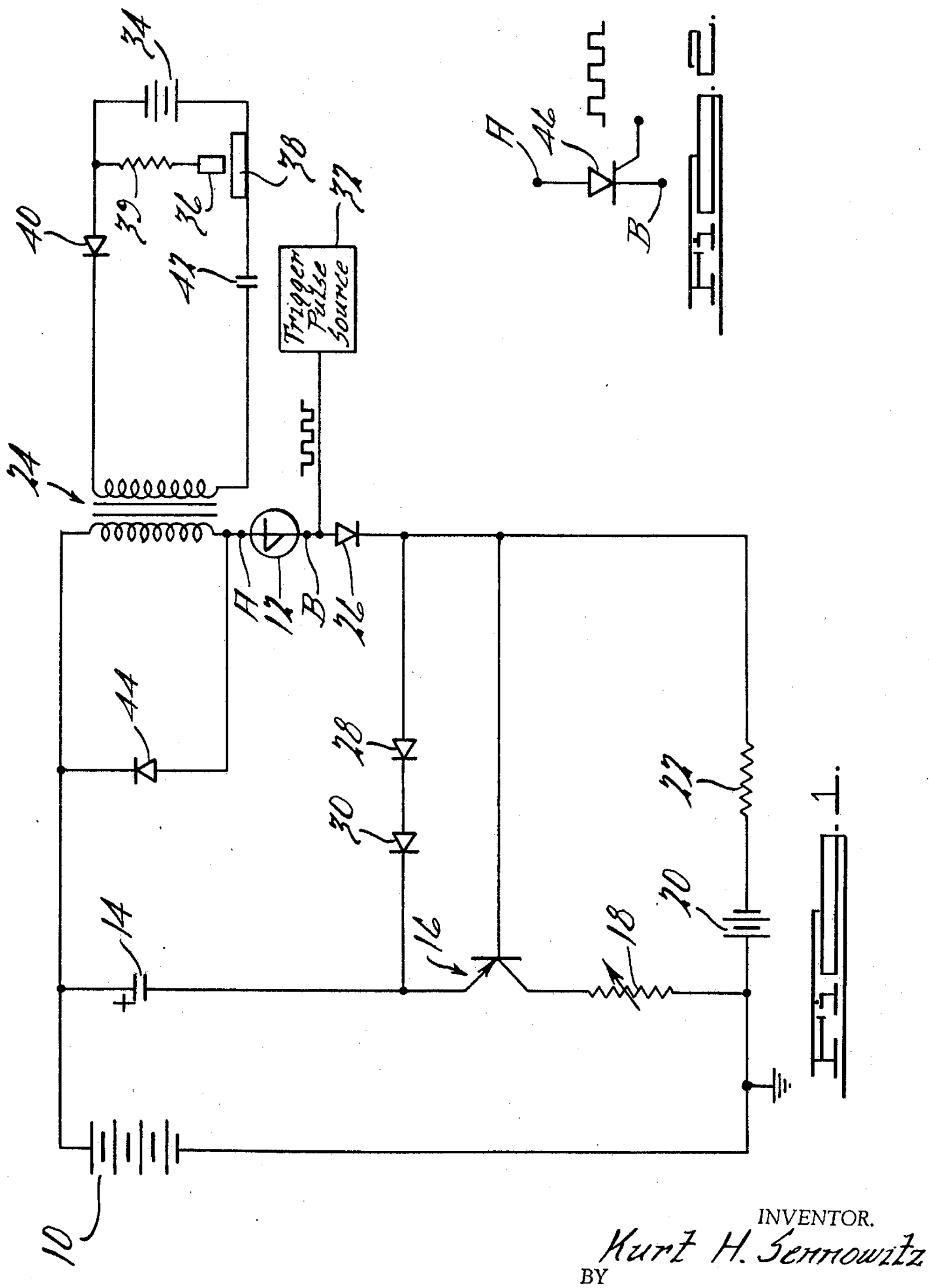
FIGURE 1 is a schematic of a power supply circuit showing my invention.
FIGURE 2 is a schematic showing of an electronic trigger device which may be used in the circuit of FIGURE 1.

Referring to FIGURE 1, it will be seen that I have provided a power supply circuit which is both simple with respect to the components utilized and reliable with respect to its operation. Power source 10 is provided for capacitor charge and for the operation of the electronic trigger device utilized, namely, four-layer diode 12. The four-layer diode is a two terminal, silicon semiconductor switch which has two stable states. To turn the device on, the voltage across the terminals must exceed the switching voltage level. To turn the device off, the current flowing through the device must be reduced below holding current level. A capacitor 14 is connected in series with the emitter and collector of transistor 16 and resistor 18. Transistor 16 is biased in a normally closed condition through a relatively low voltage source 20 and resistor 22. A transformer 24 is connected in series with four-layer diode 12. It will be understood that to provide a higher power output, two or more four-layer diodes can be connected in parallel in the circuit with the required balancing networks. Transformer 24 may have its winding ratios preselected depending upoin the gap machining pulse power desired. To complete the pulse generator circuit, diode 26 is connected in power conducting phasing with the output of four-layer diode 12, and diodes 28, 30 are series connected across the emitter-base of transistor 16. A trigger pulse source 32 is coupled to the terminal of four-layer diode 12. Trigger pulse source 32 must be capable of providing negative triggering pulses sufficient to exceed its witching voltage and trigger it into condition. Pulse source 32 may be any suitable relaxation oscillator such as is well known in the electronic arts.

The output stage of the circuit includes a DC power supply 34 connected across the machining gap comprising electrode 36 and workpiece 38 with the polarity as shown. Current limiting resistor 39 is connected in series between power supply 34 and diode 40. The secondary of transformer 24 is shown connected in series with diode 40 and capacitor 42 across the gap. The polarity of diode 40 is such that power flow through the secondary of transformer 24 from source 34 is blocked. Depending on the frequency of operation of the circuit, either diode 40 or capacitor 42 may be eliminated from the circuit. A reverse poled diode 44 is connected across the primary of transformer 24 as shown.

In the operation of the circuit, capacitor 14 is first charged to a polarity as shown. The lower plate of capacitor 14 is charged from source 10 through resistor 18 and transistor 16. Transistor 16 is maintained normally closed through bias source 20 and resistor 22. The time constant of the resistor-capacitor network may be adjusted by the magnitude of resistor 18. Four-layer diode 12 is next triggered on by a negative trigger pulse from source 32. Capacitor 14 is then discharged through the primary of transformer 24 to pass a turn-off pulse to the output stage and to the machining gap. At the same time, during the turn-on of four-layer diode 12, current is passed through diodes 26, 28, 30. Transistor 16 is back biased to its open state by the voltage drop across diodes 28, 30. The supply voltage 10 is thus effectively disconnected during the pulse output from four-layer diode 12. Capacitor 14 therefore cannot be recharged until the pulse disappears at which time four-layer diode 12 returns to its open state preparatory for the next triggering pulse and the next following cycle of operations. Turn-off occurs due to the drop of current flow through four-layer diode 12 to a level below its holding current level during capacitor discharge. Capacitor 14 must be recharged between two trigger pulses. It will be seen that the circuit above described is capable of high voltage, low current finish operation. The gap turn-off action makes possible selective varying of the machining pulse duration over a broad range. High voltage machining pulses at a frequency of over 10 kilocycles can be obtained from the circuit. The circuit is further easily triggered and operable with high efficiency.

FIGURE 2 shows a different electronic triggering device which may be substituted for four-layer diode 12 in the circuit of FIGURE 1. Controlled rectifier 46 may be connected in the circuit at terminals A and B as indicated. Controlled rectifier 46 is triggered on through positive triggering pulses applied at its gate electrode which may be provided from any suitable trigger pulse source. Turn-off is accomplished in the same manner as described for four-layer diode 12 with the inductive effect of the transformer 24 primary winding aiding turn-off. Other suitable electronic triggering devices such as ignitrons, thyratrons and the like may be used in the circuit. By "electronic triggering device" I mean any electronic switching device having a pair of principal electrodes and triggered into conduction by a pulse at a gate electrode or at one of the principal electrodes. The device is subsequently turned off by reducing the current flow therethrough below its holding current.

It will thus be seen that I have provided by my invention a new and improved machining power supply circuit for electrical discharge machining.

I claim:

1. In an electrical discharge machining apparatus for machining a conductive workpiece by a tool electrode across a dielectric coolant filled gap, a machining power supply circuit including a first power supply connected across said gap wherein the improvement comprises a second power supply, an electronic switch having a pair of principal electrodes, a resistor and a capacitor connected in series with said principal electrodes of said switch across said second power supply, a biasing source operatively connected to said switch for holding it normally closed for charging said capacitor, a transformer having a primary and a secondary winding, said secondary winding operatively connected across said gap to provide turn-off pulses thereto, an electronic triggering device having its principal electrodes connected in series combination with said primary winding, said series combination connected across said capacitor and said resistor, pulsing means operatively connected to said triggering device for turning it on to provide an output pulse to said transformer primary, and a diode operatively connected between the output of said triggering device and said switch for back biasing and opening it for the duration of said output pulse.

2. In an electrical discharge machining apparatus for machining a conductive workpiece by a tool electrode across a dielectric coolant filled gap, a machining power supply circuit including a power source connected across said gap, wherein the improvement comprises a second power source, a capacitor, a normally closed electronic switch having its principal electrodes connected in series combination with said capacitor and a charging resistor across said second power source, a transformer having a primary and a secondary winding, said secondary connected in series with a diode across said gap, said diode phased to pass a turn-off pulse thereto of opposite polarity from said first power source, a triggering device having its principal electrodes connected in series with said primary winding across said series combination, pulsing means operatively connected to said triggering device for turning it on to provide an output pulse to said primary and a turn-off pulse to said gap, said triggering device operatively connected to and operable during its conductive state to open said switch.

3. In a electrical discharge machining apparatus for machining a conductive workpiece by a tool electrode across a dielectric coolant filled gap, a machining power supply circuit including a first DC source connected across said gap wherein the improvement comprises a second power source, a capacitor and a resistor operatively connected across said second power source, a transformer having a primary and a secondary winding, said secondary winding operatively connected across said gap for providing a turn-off pulse thereto of different polarity from said first DC source, an electronic triggering device having its principal electrodes connected in series with said primary across said capacitor and resistor, means for triggering said device into its conductive state and normally closed switching means operatively connected between said second source and said capacitor and to the output of said device, said triggering device operable during its conductive state to open said switching means.

4. The combination as set forth in claim 3 wherein said secondary is connected in series with a diode across said gap.

5. The combination as set forth in claim 3 wherein said secondary is connected in series with a capacitor across said gap.

6. In an electrical discharge machining apparatus for machining a conductive workpiece by a tool electrode across a dielectric coolant filled gap, a machining power supply circuit including a first power supply connected across said gap wherein the improvement comprises a second power supply, a resistor-capacitor network operatively connected across said second power supply, a transformer having a primary and a secondary winding, said secondary operatively connected across said gap for providing a turn-off pulse thereto of opposite polarity from said first power supply, a four-layer diode having its terminals connected in series with said primary winding across said resistor-capacitor network, pulsing means connected to one terminal of said four-layer diode for turning it on to pulse said transformer, and a normally closed switching means connected between said second power supply and said capacitor, said four-layer diode operatively connected to said switching means and operable during its conductive state to open said switching means.

7. In an electrical discharge machining apparatus for machining a conductive workpiece by a tool electrode across a dielectric coolant filled gap, a machining power supply circuit including a first power supply connected across said gap wherein the improvement comprises a second power supply, a resistor-capacitor network operatively connected across said second power supply, a transformer having a primary and a secondary winding, said secondary winding operatively connected across said gap for providing a turn-off pulse thereto of opposite polarity from said first power supply, a controlled rectifier having a pair of principal electrodes and a gate electrode, said principal electrodes connected in series with said primary winding across said resistor-capacitor network, pulsing means connected to said gate electrode for periodically turning it on to pulse said transformer, and a normally closed switching means connected between said capacitor and said second power supply, said controlled rectifier operatively connected to said switching means and operable during its conductive state to open said switching means.

References Cited

UNITED STATES PATENTS

| | | |
|---|---|---|
| 2,876,386 | 3/1959 | Fefer et al. |
| 3,056,065 | 9/1962 | Porterfield. |
| 3,211,882 | 10/1965 | Webb et al. |
| 3,328,635 | 6/1967 | Webb. |

JOSEPH V. TRUHE, Primary Examiner

R. F. STAUBLY, Assistant Examiner

U.S. Cl. X.R.

315—125, 225